M. EBERT.
BUILDING TOYS.
APPLICATION FILED JULY 30, 1913.

1,100,061.

Patented June 16, 1914.
3 SHEETS—SHEET 1.

WITNESSES:
Howard P. King.
Mildred E. Brooks.

INVENTOR:
Marie Ebert,
BY Russell M. Everett,
ATTORNEY.

COLUMBIA PLANOGRAPH CO., WASHINGTON, D. C.

M. EBERT.
BUILDING TOYS.
APPLICATION FILED JULY 30, 1913.
1,100,061.
Patented June 16, 1914.
3 SHEETS—SHEET 2.
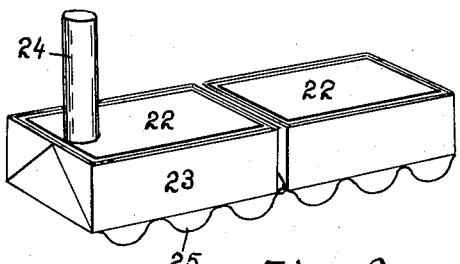
Fig. 9.
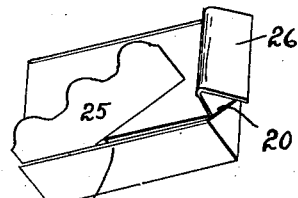
Fig. 10.
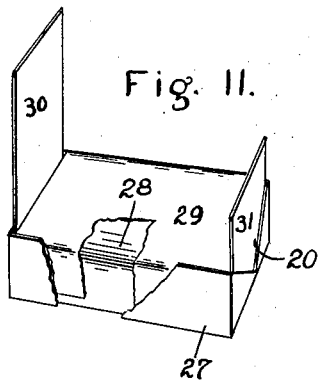
Fig. 11.
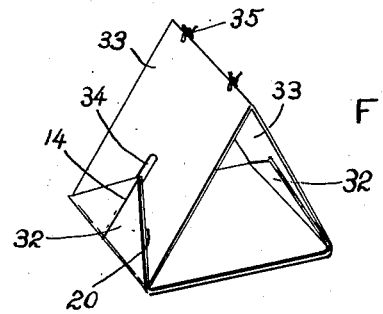
Fig. 13.
Fig. 12.
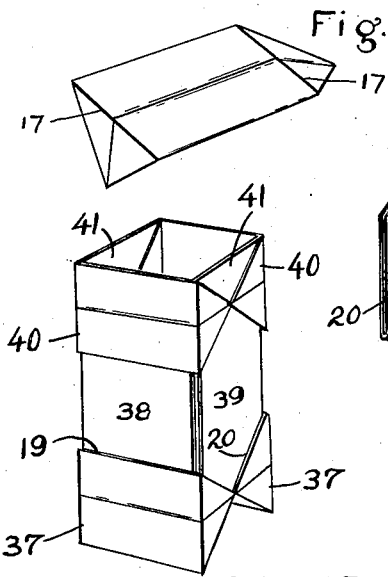
Fig. 15.
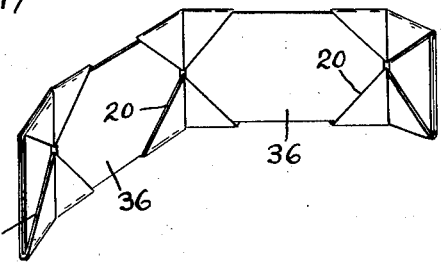
Fig. 14.
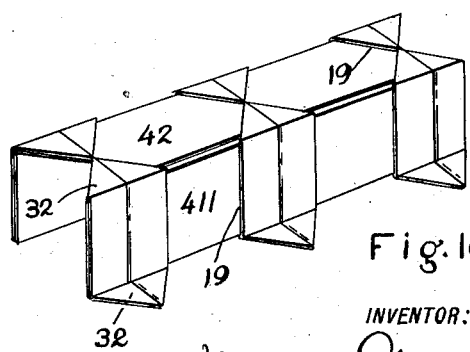
Fig. 16.
WITNESSES:
Howard R. King
Mildred E. Brooks
INVENTOR:
Marie Ebert
BY Russell W. Everett
ATTORNEY.

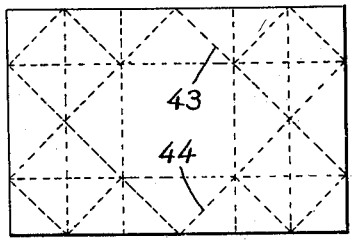
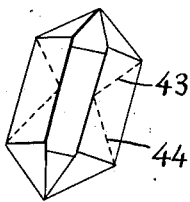
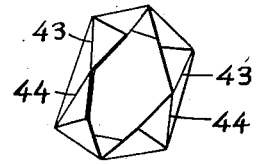
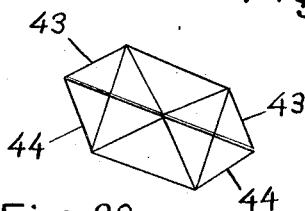
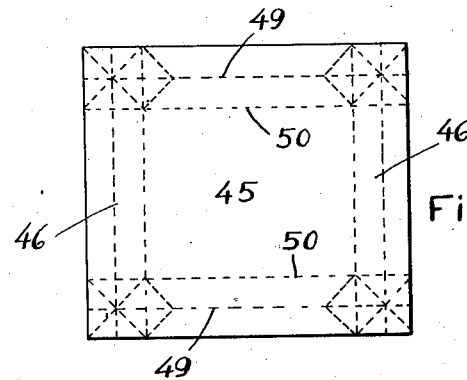
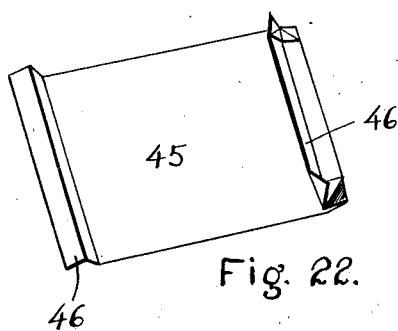
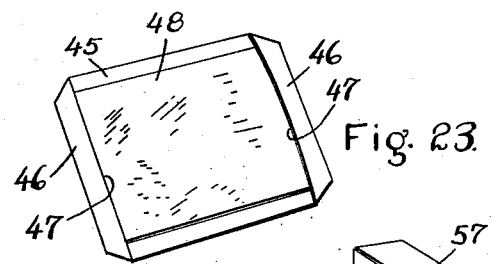
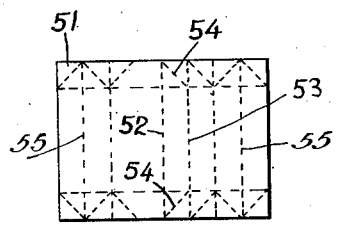
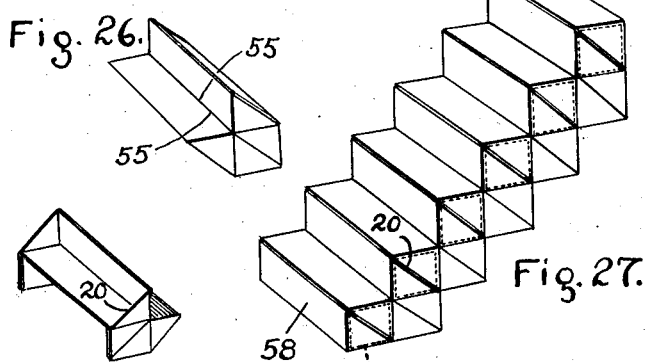

UNITED STATES PATENT OFFICE.

MARIE EBERT, OF SOUTH ORANGE, NEW JERSEY.

BUILDING TOYS.

1,100,061.

Specification of Letters Patent. Patented June 16, 1914.

Application filed July 30, 1913. Serial No. 781,936.

*To all whom it may concern:*

Be it known that I, MARIE EBERT, a subject of the Emperor of Germany, and a resident of South Orange, in the county of Essex and State of New Jersey, have invented certain Improvements in Building Toys, of which the following is a specification.

The objects of this invention are to provide a toy building unit which can be readily and easily formed by folding a piece of paper and be adapted to a multiplicity of uses; to secure such a unit which will retain its foldings and shape without the use of an adhesive or other means; to secure such a unit which after being folded can assume a plurality of forms adapted to different uses; to provide in such a building unit a plurality of pockets which can be utilized in different ways in building; to thus secure a unit which can be used in many different ways to build a wide variety of structures, and to secure other advantages and results as may be brought out in the following description.

Figure 1:
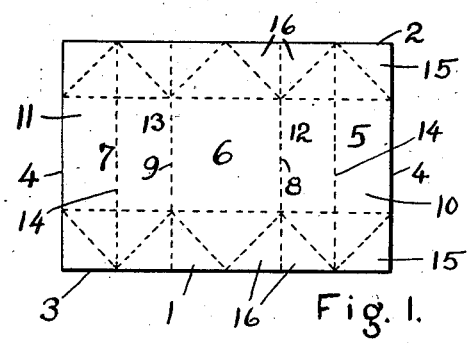
Figure 2:
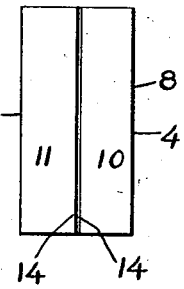
Figure 6:
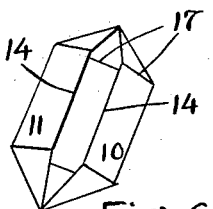
Figure 7:
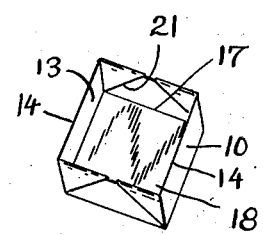
Figure 8:
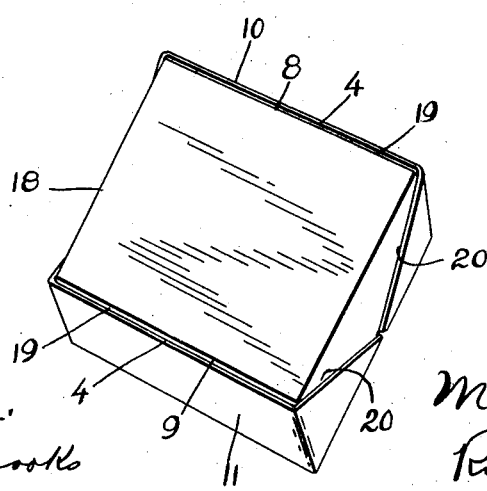

Referring to the accompanying drawings, in which like numerals of reference indicate the same parts throughout the several views, Figure 1 represents a sheet of paper from which my improved building unit has been folded, the dotted lines thereon indicating the creases formed in such folding; Figs. 2 to 6 inclusive are views of a sheet or blank at different stages of the folding; Fig. 7 is a perspective view of the unit in the form of a box, open side up; Fig. 8 is a perspective view of said box, open side down; Figs. 9 to 16 inclusive are illustrations of a few of the uses to which my building unit may be put; Fig. 17 is a representation of a blank similar to Fig. 1 showing certain additional lines or creases of folding made in forming a basket; Figs. 18 and 19 show the same at different stages of folding; Fig. 20 shows the same in flat form, similar to Fig. 5; Fig. 21 represents another blank creased still different from Figs. 1 and 17; in forming a frame; Fig. 22 shows the same being folded; Fig. 23 shows the same with the folds complete; Fig. 24 is a blank which has been folded into the form of a seat or step and spread out again; Fig. 25 shows the same folded into such a seat; Fig. 26 shows it folded into a step, and Fig. 27 shows a plurality of such steps joined to form a flight of stairs.

Figure 3:
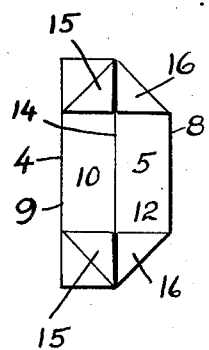
Figure 4:
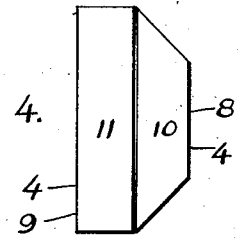

In the specific embodiment of the invention illustrated in said drawings, and referring more especially to Figs. 1 to 16 inclusive, the reference numeral 1 indicates a piece of paper or other suitable blank from which my building unit is to be folded, said blank having any desired dimensions or proportions adapted to form the finished unit of the size and shape desired. As an illustration I have shown in said figures a rectangular blank 1, having opposite long edges referred to as top and bottom 2, 3 respectively, and side edges 4, 4 of shorter length than the top and bottom, but obviously all said edges could be of other lengths without departing from the spirit and scope of the invention. In folding this blank 1 into my improved building unit, one end third, as 5, of the blank is folded over upon the middle third 6, making the crease or doubled edge 8 and then the other end third, as 7, is folded on top of the first-mentioned third 5, making the crease or doubled edge 9. Half of each of said folded thirds or panels 7 and 5, the half 10, or 11, of each next the free edge 4, is then folded back upon the other half 12, or 13, so that said edges 4 are superposed upon the creases or doubled edges 8 and 9, made by the first folds which divided the panels, and intermediate creases 14 are formed in the end panels. The blank then looks as I have shown in Fig. 2. Next, one of the folded halves 10, or 11, is returned to outspread position, so that panel is flat, and then its upper corners are folded inward, both said folds being on lines at 45° to the side edges of the blank and so as to bring the adjacent edges of the folded corners 15 and 16 contiguous, as shown in Fig. 3. It will be noted that the folded corner 15 next to the free edge 4 is single and the other corner 16 is double, and this folding having been done at both top and bottom, the panel is again doubled with its folded corners inside, as shown in Fig. 4. The other panel is then similarly treated, so that the blank assumes the appearance shown in Fig. 5. The tapered upper and lower ends are then folded toward each other upon lines 17 joining the lower ends of their sloping sides, and after that the unit can be opened as shown in Fig. 6 to assume the box form shown in Fig. 7.

Figure 5:
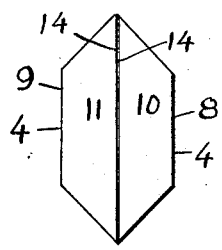

The form of the unit shown in Fig. 5, with the addition of the end creases 17, 17, is the elemental form of my unit, which may be opened into the box 18 shown in Fig. 7, or made to assume many other forms for different purposes. It is to be noted that the box 18 has a pocket 19 at each side of the box open toward the bottom thereof, said pocket being between the doubled together halves 10, 12, or 11, 13, of the end panels 5 and 7 of the blank. Also pockets 20 are formed outside the ends of the box, likewise open toward the bottom, as well as similar pockets 21 at the inner sides of said ends, all said end pockets tapering from the depth of the box at the corners to no depth at all at the center of the upper edge of the ends of the box. In the elemental form of the unit, these same side pockets 19 are in the opposite edges of the unit, and when the tapered ends are bent up, as before explained, the pockets 20 which are on the outside of the box ends are in said bent-up ends, as will be more fully explained hereinafter. It is by virtue of these plurality of pockets about the entire circumference of my building unit that said unit lends itself to forming many and varied articles. Some of these articles are illustrated in the drawings herewith, as for instance in Figs. 9 and 10 I have shown my building unit utilized to construct a toy train for kindergarten children. In doing this the unit is shaped into the box form shown in Fig. 7 of proper proportions to easily receive an empty match box 22 of the kind in common use for holding what is called Swedish matches, and which match box gives weight and solidity to the car 23. A smoke-stack 24 of rolled paper can be pushed down through a hole in the top of the match box of one car to distinguish it as a locomotive, and a semblance of wheels can be provided by slipping suitably shaped pieces 25 of card board into the side pockets 19 as shown in Fig. 10. Furthermore, the successive cars may be coupled together by a folded bit of paper 26 having each of its leaves slipped into the outside end pockets 20 of any two adjacent cars, as indicated in Fig. 10. In this manner a train of any length may be made for or by a small child very readily and easily without the use of any paste or any material aside from the empty match boxes, (which are found in every household) and bits of paper or card board.

In Fig. 11 I have shown the building unit utilized in the construction of a doll's bed, and in doing this the box form shown in Fig. 7 is utilized but placed the other side up from what it is in making the train cars just described. In folding the box 27 for this bed, a little pad 28 of cotton batting or the like is preferably placed beneath the middle third or panel of the blank before folding preferably extending to the lines 17 of subsequent folding, and beneath this pad is placed a piece 29 of tissue paper or the like to serve as a sheet, said piece of tissue paper overlapping considerably all around the pad or mattress 28. Then when the blank is folded as usual into the box form, the mattress and sheet are on top, as shown in Fig. 11 and securely held by the edges of the sheet being folded into the box. A headboard 30 and a footboard 31 are then easily provided by slipping little pieces of paper or card board into the outside pockets 20 at the two ends of the box 27, as shown, and little pillows and other bed clothes can be added as the fancy of the child dictates, although not shown in the drawings, as they form no part of the invention. Preferably the box 27 for the bed is made of such dimensions that an ordinary picture postal answers very nicely for the headboard 30 and half of such a postal for the footboard 31, such picture postals usually being had or easily obtained by a child and adding a pretty effect to the toy.

In Fig. 13 I have shown the building unit used in forming a tent, and in doing this it is taken flat as shown in Fig. 5 and the tapered ends 32 bent in the reverse direction from that to form a box as shown in Fig. 12. Obviously these ends have the pockets 20 before referred to and which pockets are separated at their adjacent upright edges by the doubling of the panels along the lines 14. Picture postals 33, 33 are then slotted longitudinally each in one end as at 34, and said bifurcated ends are inserted in the pockets 20, the two postals meeting at the top to form a simple tent as shown. Said postals are preferably tied together at their tops as at 35 although it will be understood that a single strip of paper could be used in place of the two postals, correspondingly slit at its opposite ends and doubled at its middle. Obviously by folding the tapered ends 32, 32 down flat upon the middle portion of the unit, instead of leaving them at an angle thereto as in Fig. 13; the ends of a postal card 36 can be inserted in the opposite pockets 20, 20 at one side of the median line of the unit, and the end of another postal card similarly inserted in the other pockets 20, 20 of the same unit, so that a screen or fence may be formed as shown in Fig. 14, the same bending readily upon each median line of a unit. Such a screen or fence may be formed of any desired length and I have shown the ends finished by inserting a doubled half of a postal with one leaf into the pockets 20, 20 and the other leaf into the side pocket 19, which may be done as desired. If instead of folding the tapered ends 32, 32 flat upon the body portion of the unit as in Fig. 14, or leaving them at an acute angle thereto as in Fig. 13, they may be left standing at right angles to said body portion, in which case two such units 37 may be placed with their main portions parallel and vertical and their tapered ends projecting toward each other as shown in Fig. 15, and postals 38 stood upright with their ends in the pockets 19 and other postals 39 similarly stood upright with their ends in the pockets 20, 20 so as to form a square tower as shown. The upper ends of said postals 38, 38, 39, 39 may similarly engage with upper units 40, 40 arranged like the lower ones 37, 37 and thus the tower can be built to any height. If desired, the top of the tower can be squared by inserting into the end pockets 20, 20 of the top units, short pieces 41, of postals or the like which I have shown flush with the upper edges of the main portions of the top units 40. For still another use, to form a tunnel as shown in Fig. 16 the tapered ends 32, 32 of the unit may be bent one in each direction and then stood upright in pairs with the outwardly turned ends of each pair forming a base and the inwardly turned ends at the top. Then postals 411 can be inserted at their ends into the upright side pockets 19 of alined members of adjacent pairs, to form the sides of the tunnel, and other postals 42 can be inserted at their ends in the pockets 19, 19 of said adjacent pairs of units to form the roof of the tunnel.

It will be seen from the above description of various ways of using my building unit, that there is a great variety of such uses, and I do not wish to be understood as restricting myself to any of them, those which I have shown merely being illustrative of the others.

In addition to bending the building unit as shown in Figs. 1 to 6 inclusive, into various forms upon these already creased lines of folding, the unit may be given additional creases or lines of folding, to extend its use still further. For instance in Figs. 17 to 20 inclusive I have shown the unit given additional creases or lines of folding 43, 43 and 44, 44, and which are preferably made by collapsing the box shown in Fig. 7 transversely instead of longitudinally as it would naturally collapse. When this has been done, and the creases made equally sharp and distinct with the others, the unit will open into a basket form, something as shown in Fig. 19 and may be closed flat either as shown in Fig. 20 or in the opposite direction. Further additional forms may be secured from my elemental unit by varying the distance between the various creases or changing the size of the panels 5, 6 and 7. For instance in Figs. 21, 22 and 23 I have shown a very wide middle panel 45 and comparatively narrow end panels 46, 46 and when this is folded as described in connection with the elemental form shown in Figs. 1 to 6, a frame such as is shown in Figs. 22 and 23 is obtained having lateral pockets 47, 47 beneath the folded panels 46, 46 into which the edges of a picture 48 can be slipped and held. If in folding this frame the top and bottom of the blank are folded backwardly upon lines 49, 49, before doing the other folding, no raw edges will be exposed and furthermore the two sides of the frame will be alike adapted to receive a picture. Still further, if creases or folds 50, 50 are made parallel to the last-mentioned lines of folding 49, 49, and at the same distance therefrom that said lines are from the margin, or at a distance from the top and bottom equal to the width of the panels 46 the marginal pocket portions of the frame can be erected toward the front thereof, or the unit opened into a square box form similar to Fig. 7 but much more flat and shallow so as to be more of a tray or cover.

In Figs. 24 and 27 inclusive, I have shown a blank 51 which has creases or lines of folding just like the elemental form shown in Figs. 1 to 6 inclusive except that the middle panel is twice the width of either of the end panels, then a crease or line of folding 52 is made longitudinally through the middle of the middle panel and a similar crease or line of folding 53 through the middle of one of the halves of said middle panel. Creases 54, 54 extending from the intersection of last-mentioned crease 53 at 45° with the upper and lower transverse crease for bending over the ends of the unit to the extremities to the first-mentioned crease 52. Then after folding the unit like the elemental unit shown in Fig. 5, the middle panel is doubled upon itself on the line 52, the end panel upon the swinging end of the blank being allowed to fold backward upon the line 53 so as to stand at right angles to the other end panel with their intermediate creases or folds 55, 55 abutting as shown in Fig. 26. The top and bottom of the blank then fold upon the line 54 and other lines shown, into planes perpendicular to the said line of intersection of the edges 55, 55, and if the unit is thus folded and is set down into one of the train cars for example shown in Fig. 9, in the position shown in Fig. 25, it forms a seat as will be obvious or if employed in the position shown in Fig. 26 it forms a step, series of which can be joined together to form a flight of stairs as shown in Fig. 27. Such joining is done by inserting a little square piece of paper or card board 56 into the outside end pockets 20, 20 which are next to each other in two adjacent steps of the stairs. Preferably half steps 57, 58 are employed at the top and bottom of the flight of stairs to finish the ends thereof. It will be obvious that all the different articles which I have shown produced from my building unit are based upon one and the same elemental form, and that all of them can be collapsed or flattened for convenience in packing away or handling and readily opened into their intended forms again. Many other forms can also be produced from the elemental unit as would appear to those skilled in the use of such things, and I do not wish to be understood as limiting myself at all in that respect, the forms shown being merely illustrative.

Having thus described the invention, what I claim is.

1. The hereindescribed toy building unit, comprising a sheet having a series of parallel creases by which panel portions may be folded inward from two opposite edges of the sheet and doubled back each upon itself, said sheet also having between said parallel creases oblique creases by which the outer corners of each of the parts superposed by doubling the panels may be folded in between said superposed parts, and said sheet also having creases at right angles to the panel creases through the intersections of said panel creases with said oblique creases.

2. The hereindescribed toy building unit, comprising a sheet having a plurality of series of parallel creases by which panel portions may be folded inward from two opposite edges of the sheet and doubled back each upon itself, the said series of creases being separated so that the inner edges of the doubled panels will be spaced from each other and expose a middle panel of the sheet between said end panels, said sheet also having between said parallel creases oblique creases by which the outer corners of each of the parts superposed by doubling the panels may be folded in between said superposed parts, and said sheet also having creases at right angles to the panel creases through the intersections of said panel creases with said oblique creases.

3. The hereindescribed toy building unit, comprising a sheet having at opposite edges of itself parallel creases by which marginal portions can be folded inward, said sheet having at right angles to said creases a series of parallel creases by which panel portions may be folded inward from the other two opposite edges of the sheet and doubled back each upon itself, said sheet also having between said panel creases oblique creases by which the outer corners of each of the parts superposed by doubling the panels may be folded in between said superposed parts, and said sheet also having creases at right angles to the panel creases through the intersections of said panel creases with said oblique creases.

MARIE EBERT.

Witnesses:
ARNOLD EBERT,
HOWARD P. KING.

---

Copies of this patent may be obtained for five cents each, by addressing the "Commissioner of Patents, Washington, D. C."